US012559639B2

(12) United States Patent
Shimanaka et al.

(10) Patent No.: US 12,559,639 B2
(45) Date of Patent: Feb. 24, 2026

(54) POLYMERIC DISPERSANT AND PRODUCTION METHOD THEREFOR, AQUEOUS PIGMENT DISPERSION, AND WATER-BASED INK-JET INK

(71) Applicant: DAINICHISEIKA COLOR & CHEMICALS MFG. CO., LTD., Tokyo (JP)

(72) Inventors: Hiroyuki Shimanaka, Tokyo (JP); Katsuhiko Kano, Tokyo (JP); Kosuke Kume, Tokyo (JP); Chikako Miyazaki, Tokyo (JP); Yoshikazu Murakami, Tokyo (JP); Sachio Yoshikawa, Tokyo (JP)

(73) Assignee: DAINICHISEIKA COLOR & CHEMICALS MFG. CO., LTD., Tokyo (JP)

( * ) Notice: Subject to any disclaimer, the term of this patent is extended or adjusted under 35 U.S.C. 154(b) by 258 days.

(21) Appl. No.: 18/546,549

(22) PCT Filed: Nov. 26, 2021

(86) PCT No.: PCT/JP2021/043315
§ 371 (c)(1),
(2) Date: Aug. 15, 2023

(87) PCT Pub. No.: WO2022/176301
PCT Pub. Date: Aug. 25, 2022

(65) Prior Publication Data
US 2024/0132738 A1     Apr. 25, 2024

(30) Foreign Application Priority Data

Feb. 17, 2021     (JP) ................................. 2021-023110

(51) Int. Cl.
*C09D 11/326*          (2014.01)
*B41J 2/01*            (2006.01)
(Continued)

(52) U.S. Cl.
CPC .............. *C09D 11/326* (2013.01); *B41J 2/01* (2013.01); *B41J 2/2107* (2013.01); *C08F 2/06* (2013.01);
(Continued)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055;

B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 2/18; B41J 25/312; B41J 2025/008; B41J 2202/21; B41J 2/17596; B41J 2/16508; B41J 2/1652; B41J 2/175; B41J 2/17563; C09D 11/36; C09D 11/40; C09D 11/30; C09D 11/38; C09D 11/32; C09D 11/322; C09D 11/324;

(Continued)

(56) References Cited

U.S. PATENT DOCUMENTS 5,760,105 A * 6/1998 Okada ..................... C08L 53/00
                                              524/508
5,998,535 A * 12/1999 Haldankar ........... C09D 17/002
                                              526/310

(Continued)

FOREIGN PATENT DOCUMENTS

EP          4303279        1/2024
JP        2002-053628      2/2002
(Continued)

OTHER PUBLICATIONS

International Search Report, issued in the corresponding PCT application No. PCT/JP2021/043315, dated Feb. 8, 2022, 5 pages (including translation).

(Continued)

*Primary Examiner* — Manish S Shah
(74) *Attorney, Agent, or Firm* — HSML P.C.

(57)          ABSTRACT

The present invention provides a polymeric dispersant that is to be blended in an aqueous pigment dispersion in which a pigment is finely dispersed in a stable manner and at a high level, the aqueous pigment dispersion enabling preparation of an aqueous inkjet ink capable of recording an image excellent in adhesiveness and durability on plastic media and textiles. The polymeric dispersant is a polymer that includes a constituent unit (i) derived from styrene, a constituent unit (ii) derived from methyl methacrylate and/or the like, a constituent unit (iii) derived from 2-ethylhexyl methacrylate and/or the like, a constituent unit (iv) derived from 2-hydroxyethyl methacrylate and/or the like, and a constituent unit (v) derived from methacrylic acid, and at least part of carboxy groups is neutralized with an alkali.

8 Claims, No Drawings

(51) Int. Cl.

| | |
|---|---|
| *B41J 2/21* | (2006.01) |
| *C08F 2/06* | (2006.01) |
| *C09D 11/106* | (2014.01) |
| *C09D 11/107* | (2014.01) |
| *C09D 11/32* | (2014.01) |
| *C09D 11/322* | (2014.01) |

(52) U.S. Cl.
CPC .......... *C09D 11/106* (2013.01); *C09D 11/107* (2013.01); *C09D 11/32* (2013.01); *C09D 11/322* (2013.01); *C08F 2500/26* (2013.01)

(58) Field of Classification Search
CPC ... C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; B41M 5/0011; B41M 5/0017; B41M 5/0023; B41M 5/0047; B41M 7/00; B41M 7/0072; B41M 5/52; B41M 5/5218; B41M 5/5227

See application file for complete search history.

(56) References Cited

U.S. PATENT DOCUMENTS

| | | | | |
|---|---|---|---|---|
| 6,187,854 | B1 * | 2/2001 | Spinelli .................... | C09D 7/45 |
| | | | | 524/505 |
| 6,326,449 | B1 * | 12/2001 | Haldankar .......... | C09D 17/002 |
| | | | | 526/329.2 |
| 2002/0019485 | A1 | 2/2002 | Nakajima et al. | |
| 2004/0242726 | A1 | 12/2004 | Waki et al. | |
| 2007/0100024 | A1 | 5/2007 | Gu et al. | |
| 2008/0314292 | A1 | 12/2008 | Shimanaka et al. | |
| 2010/0168316 | A1 | 7/2010 | Gobelt et al. | |
| 2013/0038659 | A1 | 2/2013 | Kaneko et al. | |
| 2016/0053125 | A1 * | 2/2016 | Shimanaka .......... | C09D 11/107 |
| | | | | 524/505 |

FOREIGN PATENT DOCUMENTS

| | | |
|---|---|---|
| JP | 4157868 | 10/2008 |
| JP | 2009-024165 | 2/2009 |
| JP | 2009-515007 | 4/2009 |
| JP | 2012-245757 | 12/2012 |
| JP | 2017-214469 | 12/2017 |
| JP | 2018-111742 | 7/2018 |
| JP | 2019-014769 | 1/2019 |
| JP | 2020-105527 | 7/2020 |
| TW | 200833767 | 8/2008 |
| WO | 2003/097753 | 11/2003 |
| WO | 2011/136000 | 11/2011 |
| WO | 2013/008691 | 1/2013 |

OTHER PUBLICATIONS

Extended European Search Report, issued in the corresponding European patent application No. 21926729.1, dated Dec. 13, 2024, 8 pages.

Taiwanese Office Action, issued in the corresponding Taiwanese patent application No. 111101379, dated Oct. 5, 2024, 11 pages with the machine translation.

* cited by examiner

POLYMERIC DISPERSANT AND PRODUCTION METHOD THEREFOR, AQUEOUS PIGMENT DISPERSION, AND WATER-BASED INK-JET INK

TECHNICAL FIELD

The present invention relates to a polymeric dispersant and a method for producing the same, an aqueous pigment dispersion, and an aqueous inkjet ink.

BACKGROUND ART

Due to high functionalization, inkjet printing is used for a variety of applications, such as personal uses, office uses, business uses, recording uses, color display uses, and color photographic uses. Further, in recent years, the applicable ranges of inkjet printing have been extended from conventional consumer type inkjet printers for office uses and wide-format inkjet printers for wide-format printing to inkjet printers for industrial applications. Inkjet printing does not require a plate for printing an image and therefore is suitable as a printing method that enables on-demand production of small-quantity, multi-variety industrial printed materials. Note that various types of inkjet printing with aqueous inkjet inks have actively been proposed due to environmental considerations.

Examples of industrial applications include signs and displays, outdoor advertisements, facility signs, displays, POP advertisements, traffic advertisements, packaging, containers, and labels.

Examples of recording media applicable to these applications include recording media (plastic media) formed of plastic materials, such as polyvinyl chloride, polyolefins, polyesters, and nylon. In addition, printing methods on textiles are shifting from conventional screen textile printing methods and other conventional methods to inkjet textile printing methods, making it possible to print photographic images and the like on textiles.

As aqueous inkjet inks required for inkjet printing for industrial applications, inkjet inks containing pigments as colorants is used because of the durability of printed images. For resultant printed images, product quality including clearness, brightness of colors, high color developability, high glossiness, and the like is required, and besides, when printing is performed on plastic media, not only adhesiveness to the plastic media but also durability including high adhesiveness, dry rub resistance, wet rub resistance, cissing resistance, water fastness, solvent resistance, chemical resistance, and the like are also required. In addition, when printing is performed on textiles, various properties, such as color fastness to washing and laundering, resistance to stretch, and dry hardiness, are also required. Further, in industrial applications, aqueous inkjet inks are required to be applicable to high-volume printing, and therefore ejection stability and high-speed printability, as well as re-dissolvability or cleaning properties such that inks dried in the recording head are re-dissolved by a liquid medium, are also required.

Thus, there have been proposed inkjet inks in which an acrylic or urethane-based binder component capable of forming a film is added in order to record a printed image having improved durability (Patent Literatures 1 and 2). In addition, pigments need to be finely dispersed in a stable manner in aqueous pigment inkjet inks, and therefore there have been proposed: a pigment dispersion in which a pigment is finely dispersed in a stable manner over time using a surfactant or a polymeric dispersant; and an inkjet ink using the pigment dispersion (Patent Literature 3).

CITATION LIST

Patent Literature

Patent Literature 1: Japanese Patent No. 4157868
Patent Literature 2: Japanese Translation of PCT International Application Publication No. 2009-515007
Patent Literature 3: International Publication No. WO 2013/008691

SUMMARY OF INVENTION

Technical Problem

However, it has been difficult to record an image excellent in adhesiveness and durability, such as rub resistance, on plastic media and textiles even with inkjet inks using pigment dispersions proposed in Patent Literatures 1 to 3. In addition, it cannot necessarily be said that ejection properties from an inkjet recording head are sufficient even for inkjet inks using conventional pigment dispersions, and therefore there has been room for further improvements.

The present invention has been completed in view of such problems of conventional techniques, and an object of the present invention is to provide: a polymeric dispersant that is to be blended in an aqueous pigment dispersion in which a pigment is finely dispersed in a stable manner and at a high level, the aqueous pigment dispersion enabling preparation of an aqueous inkjet ink capable of recording an image excellent in adhesiveness and durability on plastic media and textiles; and a method for producing the polymeric dispersant.

Another object of the present invention is to provide: an aqueous pigment dispersion in which a pigment is finely dispersed in a stable manner and at a high level, the aqueous pigment dispersion enabling preparation of an aqueous inkjet ink capable of recording an image excellent in adhesiveness and durability on plastic media and textiles; and an aqueous inkjet ink using the aqueous pigment dispersion.

Solution to Problem

That is, the present invention provides a polymeric dispersant described below.

[1] A polymeric dispersant that is for dispersing a pigment and is to be blended in an aqueous pigment dispersion to be used for an aqueous inkjet ink for plastic media printing or textile printing, wherein the polymeric dispersant is a polymer satisfying the following features (1) and (2),

[Feature (1)]:
the polymer comprises 10 to 30% by mass of a constituent unit (i) derived from styrene, 10 to 30% by mass of a constituent unit (ii) derived from at least any one of methyl methacrylate and ethyl methacrylate, 10 to 30% by mass of a constituent unit (iii) derived from at least any one of 2-ethylhexyl methacrylate and dodecyl methacrylate, 10 to 20% by mass of a constituent unit (iv) derived from at least any one of 2-hydroxyethyl methacrylate and 2-hydroxypropyl methacrylate, and 10 to 20% by mass of a constituent unit (v) derived from methacrylic acid; the total content of the constituent units (i) to (v) is 90% by mass or more; the polymer comprises a constituent unit derived from 6 or more monomers; and at least part of carboxy groups is neutralized with an at least one alkali selected from the group consisting of ammonia and dimethylaminoethanol; and

[Feature (2)]:

the polymer has a number average molecular weight of 15,000 to 25,000; a peak top molecular weight of 25,000 to 50,000; and a polydispersity index (weight average molecular weight/number average molecular weight) of 1.7 to 2.4, and a proportion of an area (H) of a molecular weight peak in a range of a molecular weight of 50,000 or higher in the total area (T) of the molecular weight peak in a gel permeation chromatograph, (H/T), is 15 to 30%.

[2] The polymeric dispersant according to [1], wherein the constituent unit (iii) is a constituent unit derived from dodecyl methacrylate, or a constituent unit derived from 2-ethylhexyl methacrylate and dodecyl methacrylate.

In addition, the present invention provides a method for producing a polymeric dispersant, the method described below.

[3] A method for producing a polymeric dispersant, being a method for producing the polymeric dispersant according to [1] or [2], the method comprising a step of subjecting monomers to solution polymerization in a polymerization solvent comprising diethylene glycol monobutyl ether and then adding an alkali to make a polymerization solution into an aqueous solution.

[4] The method for producing a polymeric dispersant according to [3], wherein the solution polymerization is performed in the polymerization solvent comprising 70% by mass or more of diethylene glycol monobutyl ether based on the amount of the polymeric dispersant that is a polymer intended to be produced.

Further, the present invention provides an aqueous pigment dispersion described below.

[5] An aqueous pigment dispersion to be used for an aqueous inkjet ink for plastic media printing or textile printing, wherein the aqueous pigment dispersion comprises a pigment, water, a water-soluble organic solvent, and a polymeric dispersant that disperses the pigment, and the polymeric dispersant is the polymeric dispersant according to [1] or [2].

[6] The aqueous pigment dispersion according to [5], wherein the water-soluble organic solvent is diethylene glycol monobutyl ether.

[7] The aqueous pigment dispersion according to [5] or [6], wherein the content of the pigment is 5 to 60% by mass, the content of the water is 20 to 80% by mass, the content of the water-soluble organic solvent is 30% by mass or less, and the content of the polymeric dispersant is 0.5 to 20% by mass.

Furthermore, the present invention provides an aqueous inkjet ink described below.

[8] An aqueous inkjet ink for plastic media printing and textile printing, comprising the aqueous pigment dispersion according to any one of [5] to [7].

Advantageous Effects of Invention

The present invention can provide: a polymeric dispersant that is to be blended in an aqueous pigment dispersion in which a pigment is finely dispersed in a stable manner and at a high level, the aqueous pigment dispersion enabling preparation of an aqueous inkjet ink capable of recording an image excellent in adhesiveness and durability on plastic media and textiles; and a method for producing the polymeric dispersant.

In addition, the present invention can provide: an aqueous pigment dispersion in which a pigment is finely dispersed in a stable manner and at a high level, the aqueous pigment dispersion enabling preparation of an aqueous inkjet ink capable of recording an image excellent in adhesiveness and durability on plastic media and textiles; and an aqueous inkjet ink using the aqueous pigment dispersion.

DESCRIPTION OF EMBODIMENTS

<Polymeric Dispersant>

Hereinafter, embodiments of the present invention will be described, but the present invention is not limited to the following embodiments. Physical property values herein are values at normal temperature (25° C.) unless otherwise noted. Hereinafter, the "aqueous pigment dispersion" will also simply be referred to as "pigment dispersion," and the "aqueous inkjet ink" will also simply be referred to as "ink."

A polymeric dispersant of the present invention is a dispersant that is for dispersing a pigment and is to be blended in an aqueous pigment dispersion to be used for an aqueous inkjet ink for plastic media printing and textile printing, and is a polymer having the following features (1) and (2). Hereinafter, details on the polymeric dispersant of the present invention will be described.

[Feature (1)]:

The polymer includes 10 to 30% by mass of a constituent unit (i) derived from styrene, 10 to 30% by mass of a constituent unit (ii) derived from at least any one of methyl methacrylate and ethyl methacrylate, 10 to 30% by mass of a constituent unit (iii) derived from at least any one of 2-ethylhexyl methacrylate and dodecyl methacrylate, 10 to 20% by mass of a constituent unit (iv) derived from at least any one of 2-hydroxyethyl methacrylate and 2-hydroxypropyl methacrylate, and 10 to 20% by mass of a constituent unit (v) derived from methacrylic acid;

the total content of the constituent units (i) to (v) is 90% by mass or more;

the polymer includes a constituent unit derived from 6 or more monomers; and at least part of carboxy groups is neutralized with an at least one alkali selected from the group consisting of ammonia, dimethylaminoethanol, sodium hydroxide, and potassium hydroxide; and

[Feature (2)]:

The polymer has a number average molecular weight of 15,000 to 25,000;

a peak top molecular weight of 25,000 to 50,000; and a polydispersity index (weight average molecular weight/ number average molecular weight) of 1.7 to 2.4, and a proportion of an area (H) of a molecular weight peak in a range of a molecular weight of 50,000 or higher in the total area (T) of the molecular weight peak in a gel permeation chromatograph, (H/T), is 15 to 30%.

(Feature (1))

The polymeric dispersant is a polymer including 10 to 30% by mass, preferably 15 to 25% by mass, of a constituent unit (i) derived from styrene. Note that each of the proportions (% by mass) of constituent units (i) to (v) is a proportion in the total amount (100% by mass) of the constituent units (i) to (v). The polymeric dispersant has an aromatic ring derived from styrene, and therefore effects such as hydrophobicity, adsorption onto pigments due to π-π stacking, and adhesiveness of a coating film, are exhibited. When the proportion of the constituent unit (i) is less than 10% by mass, the above-described effects are not exhibited. On the other hand, when the proportion of the constituent unit (i) is more than 30% by mass, the polymer is too hard, and the polymerizability is lowered and therefore monomers are likely to be left in producing a high-molecular-weight polymer.

The polymeric dispersant includes 10 to 30% by mass, preferably 20 to 30% by mass, of a constituent unit (ii) derived from at least any one of methyl methacrylate and ethyl methacrylate. By using these monomers, the molecular weight of the polymer can easily be increased. In addition, these monomers have a relatively low molecular weight, and therefore the polymerization rate can be enhanced.

When the proportion of the constituent unit (ii) is less than 10% by mass, the polymerizability may be insufficient. On the other hand, when the proportion of the constituent unit (ii) is more than 30% by mass, the proportions of the other constituent units are relatively decreased and therefore expected effects may not be obtained.

The polymeric dispersant includes 10 to 30% by mass, preferably 15 to 25% by mass, of a constituent unit (iii) derived from at least any one of 2-ethylhexyl methacrylate and dodecyl methacrylate. When the polymer includes this constituent unit (iii), thereby the polymer is plasticized to be soft and therefore is capable of forming a soft coating film. When the proportion of the constituent unit (iii) is less than 10% by mass, the plasticity of the polymer may be deficient. On the other hand, when the proportion of the constituent unit (iii) is more than 30% by mass, the polymer may excessively be softened, and the proportions of the other constituent units are relatively reduced or the hydrophobicity is excessively enhanced and therefore hydrophilicity may be deficient.

The polymeric dispersant includes 10 to 20% by mass, preferably 15 to 20% by mass, of a constituent unit (iv) derived from at least any one of 2-hydroxyethyl methacrylate and 2-hydroxypropyl methacrylate. That is, the polymeric dispersant has hydroxy groups derived from these monomers and therefore is likely to form hydrogen bonds with a substrate, such as plastic media and textiles (fabrics), and can improve adhesiveness of a coating film (image) to a substrate. In addition, having hydroxy groups, the polymeric dispersant is likely to hydrogen bond with water and can improve hydrophilicity. When the proportion of the constituent unit (iv) is less than 10% by mass, the above-described effects are not exhibited. On the other hand, when the proportion of the constituent unit (iv) is more than 20% by mass, hydrophilicity is excessively enhanced, and therefore the water fastness of a coating film to be formed may be lowered.

The polymeric dispersant includes 10 to 20% by mass, preferably 15 to 20% by mass, of a constituent unit (v) derived from methacrylic acid. That is, the polymeric dispersant is a polymer having carboxy groups derived from methacrylic acid, and therefore by neutralizing at least part of these carboxy groups with an alkali, the polymer can be dissolved in water and adhesiveness of a coating film (image) to a substrate can be improved. When the proportion of the constituent unit (v) is less than 10% by mass, the water-solubility of the polymeric dispersant is deficient. On the other hand, when the proportion of the constituent unit (v) is more than 20% by mass, the hydrophilicity of the polymeric dispersant is excessively high, and therefore the water fastness of an image (coating film) may be lowered.

In the polymeric dispersant (polymer), the total content of the above-described constituent units (i) to (v) is 90% by mass or more, more preferably 95% by mass or more. The polymer may further include a constituent unit derived from an additional monomer at a proportion of less than 10% by mass. As the additional monomer, conventionally known vinyl-based monomers and the like can be used. Specific examples of the additional monomer include vinyl-based monomers, such as vinyl toluene, vinyl acetate, and vinyl pyrrolidone; alkyl methacrylates, such as butyl methacrylate, isobutyl methacrylate, t-butyl methacrylate, hexyl methacrylate, octyl methacrylate, decyl methacrylate, isodecyl methacrylate, cetyl methacrylate, stearyl methacrylate, isostearyl methacrylate, and behenyl methacrylate; aromatic ring-containing methacrylates, such as benzyl methacrylate, phenyl methacrylate, naphthyl methacrylate, and phenoxyethyl methacrylate; alicyclic group-containing methacrylates, such as cyclohexyl methacrylate, t-butylcyclohexyl methacrylate, 3,3,5-trimethylcyclohexyl methacrylate, dicyclopentanyl methacrylate, and isobornyl methacrylate; hydroxy group-containing methacrylates, such as polyethylene glycol methacrylate and polypropylene glycol methacrylate; glycol monoether methacrylates, such as methoxyethyl methacrylate, ethoxyethyl methacrylate, ethoxyethoxyethyl methacrylate, butoxyethyl methacrylate, and dicyclopentenyloxyethyl methacrylate; and amino group-containing or quaternary ammonium salt-containing methacrylates, such as dimethylaminoethyl methacrylate, diethylaminoethyl methacrylate, t-butylaminoethyl methacrylate, and methacryloyloxyethyltrimethylammonium chloride.

The polymeric dispersant (polymer) preferably substantially consists of the above-described constituent units (i) to (v).

The polymeric dispersant is a polymer including a constituent unit derived from 6 or more monomers, and is preferably a polymer including a constituent unit derived from 6 or more monomers among monomers that form the above-described constituent units (i) to (v) (however, styrene and methacrylic acid are essential). The polymer including a constituent unit derived from 6 or more monomers can achieve both pigment dispersibility and coating film performance (such as adhesiveness of a coating film (image) to a substrate).

The polymeric dispersant is a polymer in which at least part of, preferably 10% by mass or more of, carboxy groups derived from methacrylic acid are neutralized and ionized, with an alkali. By neutralizing at least part of the carboxy groups with an alkali, the hydrophilicity of the polymer can be improved. The alkali that neutralizes the carboxy groups is at least one selected from the group consisting of ammonia, dimethylaminoethanol, sodium hydroxide, and potassium hydroxide. When the neutralization is performed with ammonia or dimethylaminoethanol, ammonia or dimethylaminoethanol volatilizes after a coating film is formed by drying, and carboxyl groups are formed as a result of deionization, and therefore the water fastness of the coating film can be improved. When the neutralization is performed with sodium hydroxide or potassium hydroxide, deionization does not occur even after the coating film is formed, but re-dissolvability of the polymeric dispersant can be improved. The alkali may be selected and used according to the printing process, the durability of the coating film (image), and the like.

(Feature (2))

The polymeric dispersant is a polymer having the above-described feature (1). That is, the polymeric dispersant is a polymer containing larger amount of a high-molecular-weight component, and by using such a polymer as the polymeric dispersant, a coating film (image) excellent in adhesiveness to a substrate and durability can be formed. As a dispersant for dispersing a pigment in a liquid medium, surfactants having a molecular weight of several hundred and polymers having a molecular weight of several thousand to about 10,000 have conventionally been used. In contrast, by using the polymer containing a larger amount of a high-molecular-weight component as a dispersant, the adhesiveness to a substrate, and the like can be improved. In addition, by adopting a composition having the above-described feature (1) for the polymeric dispersant even if it has a high molecular weight, a pigment can be finely dispersed in a more stable manner in a liquid medium.

The polymeric dispersant is a polymer having a number average molecular weight (Mn) of 15,000 to 25,000, preferably 16,000 to 23,000. When the Mn of the polymer is lower than 15,000, it is difficult to enhance the durability of a coating film to be formed. On the other hand, when the Mn of the polymer is higher than 25,000, the viscosity of the pigment dispersion may be too high. Note that both the number average molecular weight (Mn) and the weight average molecular weight (Mw) herein are values measured by gel permeation chromatography (GPC) in terms of polystyrene.

The polymeric dispersant is a polymer having a peak top molecular weight of 25,000 to 50,000, preferably 28,000 to 40,000, in GPC. When the peak top molecular weight of the polymer is lower than 25,000, the amount of a low-molecular-weight component is large, making it difficult to enhance the durability of a coating film to be formed. On the other hand, when the peak top molecular weight of the polymer is higher than 50,000, the viscosity of the pigment dispersion may be too high.

The polymeric dispersant is a polymer having a polydispersity index (PDI=weight average molecular weight (Mw)/ number average molecular weight (Mn)) of 1.7 to 2.4, preferably 1.8 to 2.1. A polymer having a polydispersity index (PDI) within the above-described range is preferable because it contains a low-molecular-weight component and a high-molecular-weight component in a well-balanced manner.

The polymeric dispersant is a polymer such that a proportion of an area (H) of a molecular weight peak in a range of a molecular weight of 50,000 or higher in the total area (T) of the molecular weight peak in a gel permeation chromatograph, (H/T), is 15 to 30%. That is, when the polymer contains a relatively high-molecular-weight component having a molecular weight of 50,000 or higher at a predetermined proportion, thereby a coating film (image) excellent in adhesiveness to a substrate and durability can be formed. When H/T is less than 15%, the above-described effects cannot be obtained. On the other hand, when H/T is more than 30%, the amount of the high-molecular-weight component is too large, and therefore the viscosity of the pigment dispersion may increase excessively. To suitably achieve the viscosity of the pigment dispersion, the dispersion stability of a pigment, the adhesiveness of an image to a substrate, the durability of a coating film, and the like, H/T is preferably 15 to 25%.

<Method for Producing Polymeric Dispersant>

A method for producing a polymeric dispersant of the present invention is a method for producing the above-described polymeric dispersant and includes a step of subjecting monomers to solution polymerization, preferably radical solution polymerization, in a polymerization solvent containing diethylene glycol monobutyl ether and then adding an alkali to make a polymerization solution into an aqueous solution.

When the above-described polymeric dispersant (polymer) is produced, a relatively large amounts of hydrophobic monomers need to be used, but the use amount of methacrylic acid is not so large. Further, the intended polymer contains a large amount of a high-molecular-weight component. Therefore, when polymerization is performed in a solvent which is used for general solution polymerization and then the polymerization solution is neutralized with an alkali to make a resultant polymer water-soluble, trouble such as precipitation or cloudiness is likely to occur. Further, affinity of a resultant polymer to a pigment is likely to be deficient, which makes the resultant polymer inadequate as a polymeric dispersant. In contrast, in the method for producing a polymeric dispersant of the present invention, the monomers are polymerized in the polymerization solvent containing diethylene glycol monobutyl ether. Diethylene glycol monobutyl ether easily dissolves the monomers and has high affinity to water, and therefore the polymer is unlikely to precipitate even when neutralization is performed with an alkali. Further, the polymeric dispersant can wet a pigment after the polymeric dispersant is dissolved in water, and therefore in spite of the fact that the polymeric dispersant is a polymer which contains a large amount of a high-molecular-weight component and has relatively high hydrophobicity, the polymeric dispersant can sufficiently disperse the pigment.

The solution polymerization is preferably performed using 50% by mass or more, more preferably 100% by mass or more, of diethylene glycol monobutyl ether based on the amount of the polymer intended to be produced. After the solution polymerization, the alkali is added to neutralize at least part of the carboxy groups derived from methacrylic acid and make the polymerization solution into an aqueous solution. Thereby, a substantially transparent aqueous solution containing a polymeric dispersant can be obtained. Note that as the alkali, at least one selected from the group consisting of the above-described ammonia, dimethylaminoethanol, sodium hydroxide, and potassium hydroxide can be used.

Radical solution polymerization may be performed in accordance with a conventionally known method except that the polymerization solvent containing diethylene glycol monobutyl ether is used. For example, the polymerization can be performed in the presence of a peroxide-based radical initiator or an azo-based radical initiator for a predetermined time under heating. Examples of the peroxide-based radical initiator include benzoyl peroxide. Examples of the azo-based radical initiator include azobisisobutyronitrile. In addition, the molecular weight may be adjusted using a chain transfer agent such as thiol.

The polymerization solvent may further contain an organic solvent (additional organic solvent) other than diethylene glycol monobutyl ether. As the additional organic solvent, a water-soluble organic solvent is preferably used. If a water-insoluble organic solvent or an organic solvent hardly dissolvable in water is used, the water-insoluble organic solvent or the organic solvent hardly dissolvable in water needs to be removed when an aqueous pigment dispersion is prepared.

Examples of the water-soluble organic solvent include alcohol-based solvents, such as methanol, ethanol, isopropanol, propyl alcohol, butanol, and isobutanol; glycol solvents, such as ethylene glycol, propylene glycol, and glycerin; glycol ethers, such as diethylene glycol, triethylene glycol, tetraethylene glycol, dipropylene glycol, tripropylene glycol, ethylene glycol monobutyl ether, triethylene glycol monobutyl ether, tetraethylene glycol monobutyl ether, propylene glycol monomethyl ether, dipropylene glycol monomethyl ether, tripropylene glycol monomethyl ether, diethylene glycol dimethyl ether, diethylene glycol diethyl ether, dipropylene glycol dimethyl ether, and 3-methoxy-3-methyl-1-butanol; amide-based solvents, such as dimethylformamide, dimethylacetamide, pyrrolidone, N-methylpyrrolidone, 3-methoxy-N,N-dimethylpropana-mide, and 3-butoxy-N,N-dimethylpropanamide; carbonate-based solvents, such as ethylene carbonate, propylene car-bonate, and dimethyl carbonate; dimethyl sulfoxide; tetramethylurea; and dimethyl imidazolidinone.

<Aqueous Pigment Dispersion>

An aqueous pigment dispersion of the present invention is an aqueous pigment dispersion to be used for an aqueous inkjet ink for plastic media printing or textile printing and contains a pigment, water, a water-soluble organic solvent, and a polymeric dispersant that disperses the pigment. This polymeric dispersant is the above-described polymeric dis-persant.

(Pigment)

As the pigment, organic pigments and inorganic pigments can be used. Examples of the organic pigments include soluble azo pigments, insoluble azo pigments, phthalocya-nine pigments, quinacridone pigments, isoindolinone pig-ments, isoindoline pigments, perylene pigments, perinone pigments, dioxazine pigments, anthraquinone pigments, dianthraquinonyl pigments, anthrapyrimidine pigments, anthanthrone pigments, indanthrone pigments, flavanthrone pigments, pyranthrone pigments, and diketopyrrolopyrrole pigments. Examples of the inorganic pigments include tita-nium dioxide, iron oxide, antimony pentoxide, zinc oxide, silica, cadmium sulfide, calcium carbonate, barium carbon-ate, barium sulfate, clay, talc, chrome yellow, and carbon black.

Examples of preferred pigments, when expressed by Color Index (C.I.) numbers, include C.I. Pigment Blue 15:3, 15:4, and 15:6; C.I. Pigment Red 122, 176, 254, 269, and 291; C.I. Pigment Violet 19 and 23; C.I. Pigment Yellow 74, 155, and 180; C.I. Pigment Green 36 and 58; C.I. Pigment Orange 43 and 71; C.I. Pigment Black 7; and C.I. Pigment White 6, and these are pigments which are used for ordinary inkjet inks.

The pigment is preferably an organic pigment, such as a quinacridone-based pigment and a phthalocyanine-based pigment. The quinacridone-based pigment is a pigment that has strong hydrogen bonds and is hard to disperse. The phthalocyanine based pigment is a pigment that has a metal complex structure and therefore crystalizes easily and is relatively hard to disperse. In addition, both pigments have strong hydrophobicity and are likely to adsorb a polymeric dispersant strongly, and therefore ink droplets (film) after drying are hard to re-dissolve. In contrast, by using the above-described polymeric dispersant, even the quinacri-done-based pigment and the phthalocyanine-based pigment, which are pigments hard to disperse, can be dispersed easily and finely, and re-dissolvability can also be imparted, and therefore an aqueous pigment dispersion which enables preparation of an aqueous inkjet ink having favorable high-speed printability can be made.

As the quinacridone-based pigment and the phthalocya-nine-based pigment, those used for general inkjet inks can be used. Specific examples of the quinacridone-based pigment include C.I. Pigment Red 122, 209, and 202, and C.I. Pigment Orange 48 and 49, and C.I. Pigment Red 19.

The number average particle size (primary particle size) of the organic pigment is preferably 150 nm or smaller. The number average particle size (primary particle size) of the inorganic pigment is preferably 300 nm or smaller. By using a pigment having a number average particle size within the above-described range, the optical density, chroma, color developability, and print quality of an image to be recorded can be improved, and sedimentation of the pigment in an ink can moderately suppressed. The number average particle size of the pigment can be measured using, for example, an electron microscope or a light scattering particle size distri-bution analyzer.

The pigment may be surface-treated with a surface treat-ment agent, such as a polymeric dispersant, a silane coupling agent, an inorganic substance (such as silica, zirconia, and sulfuric acid), and a pigment derivative (synergist). For example, when the pigment is synthesized, when pigmen-tation is performed, or when the pigment is micronized, any of these surface treatment agents may be added or may be allowed to co-exist. In addition, as the quinacridone-based pigment, a composite, such as a compound obtained by mixing and crystallizing different pigments and a solid solution pigment, can also be used.

(Liquid Medium)

The aqueous pigment dispersion contains, as a dispersion medium for the pigment, a liquid medium containing water and a water-soluble organic solvent. As the water-soluble organic solvent, the above-described alcohol-based solvents, glycol-based solvents, amide-based solvents, and the like, which are used as the polymerization solvent, can be used. Among others, the water-soluble organic solvent is prefer-ably diethylene glycol monobutyl ether. When diethylene glycol monobutyl ether is used as the polymerization solvent in producing the polymeric dispersant (polymer), the aque-ous pigment dispersion can be prepared using the solution of the polymeric dispersant obtained by polymerization as it is, and therefore diethylene glycol monobutyl ether is prefer-ably used as the polymerization solvent because the pro-cesses can be simplified.

(Aqueous Pigment Dispersion)

The content of the pigment in the aqueous pigment dispersion is preferably 5 to 60% by mass. When the pigment is an organic pigment, the content of the organic pigment in the aqueous pigment dispersion is preferably 5 to 30% by mass, more preferably 10 to 25% by mass. When the pigment is an inorganic pigment, the inorganic pigment has a large specific gravity and therefore the content of the inorganic pigment in the aqueous pigment dispersion is preferably 20 to 60% by mass, more preferably 30 to 50% by mass.

The content of water in the aqueous pigment dispersion is preferably 20 to 80% by mass. By allowing the aqueous pigment dispersion to contain an appropriate amount of water, an aqueous inkjet ink can be prepared.

The content of the water-soluble organic solvent in the aqueous pigment dispersion is preferably 30% by mass or less, more preferably 0.5 to 20% by mass. When the content of the water-soluble organic solvent is more than 30% by mass, a recorded image may be hard to dry.

The content of the polymeric dispersant in the aqueous pigment dispersion is preferably 0.5 to 20% by mass. When the content of the polymeric dispersant is less than 0.5% by mass, it may be somewhat hard to disperse the pigment stably. On the other hand, when the content of the polymeric dispersant is more than 20% by mass, the aqueous pigment dispersion is too viscous and exhibits non-Newtonian vis-cosity, which may make it somewhat hard to eject an ink linearly by an inkjet system.

The content of the polymeric dispersant in the aqueous pigment dispersion is also preferably set according to the type, surface characteristics, particle size, and the like of the pigment. Specifically, the amount of the polymeric dispersant is preferably set to 5 to 50 parts by mass, more preferably 10 to 30 parts by mass, based on 100 parts by mass of the organic pigment. In addition, the amount of the polymeric dispersant is preferably set to 1 to parts by mass, more preferably 3 to 10 parts by mass, based on 100 parts by mass of the inorganic pigment.

(Additional Components)

The aqueous pigment dispersion may further contain an alkali in order to neutralize the polymeric dispersant or adjust pH. As the alkali, at least one selected from the group consisting of the above-described ammonia, dimethylaminoethanol, sodium hydroxide, and potassium hydroxide can be used. The content of the alkali in the aqueous pigment dispersion is preferably set to 0.5 to 5% by mass.

The aqueous pigment dispersion can further contain at least one emulsion of an acrylic resin emulsion and a urethane resin emulsion as a binder component. The content of the emulsion in terms of solid content in the aqueous pigment dispersion is preferably 5 to 20% by mass. Containing any of these emulsions, the aqueous pigment dispersion enables preparation of an aqueous inkjet ink capable of recording an image having improved durability, such as rub resistance, and glossiness.

As the acrylic resin emulsion, an emulsion obtained by polymerizing styrene and an acrylic acid-based monomer in the presence of a surfactant, the emulsion having a dispersed particle size (number average particle size) of 50 to 200 nm, can be used. As the urethane resin emulsion, an emulsion obtained by reacting a diisocyanate, such as isophorone diisocyanate; a polyol, such as polycarbonate diol; a diol, such as diethylene glycol; a diol monocarboxylic acid, such as dimethylol propanoic acid; and the like, and self-emulsifying the reaction product with alkali water while performing chain extension with isophoronediamine, the emulsion having a dispersed particle size (number average particle size) of 50 to 200 nm, can be used.

(Physical Properties of Aqueous Pigment Dispersion)

The viscosity of the aqueous pigment dispersion can appropriately be set according to the characteristics of the pigment, the viscosity of the aqueous inkjet ink intended to be prepared, and the like. When an organic pigment is used, the viscosity of the aqueous pigment dispersion at 25° C. is preferably 3 to 20 mPa·s. When an inorganic pigment is used, the viscosity of the aqueous pigment dispersion at 25° C. is preferably 5 to 30 mPa·s.

The surface tension of the aqueous pigment dispersion at 25° C. is preferably 15 to 45 mN/m, more preferably 20 to 40 mN/m. The surface tension of the aqueous pigment dispersion can be adjusted by, for example, the type and amount of the water-soluble organic solvent or addition of a surfactant or the like.

(Method for Preparing Aqueous Pigment Dispersion)

The aqueous pigment dispersion can be prepared according to a conventionally known method. For example, a mixture of a pigment, a polymeric dispersant, and the like is prepared adding water, and a water-soluble organic solvent as necessary. Then, the pigment is finely dispersed using a paint shaker, a ball mill, an attritor, a sand mill, a horizontal media mill, a colloid mill, a roll mill, or the like to prepare a dispersion. To the prepared dispersion, water and a water-soluble organic solvent are added, and a binder component (emulsion), other additives, and the like are added as necessary to adjust the concentration as desired. Further, pH may be adjusted by adding an alkali or the like. Further, by adding additives, such as a surfactant and an antiseptic, as necessary, the intended aqueous pigment dispersion can be obtained. Note that after mixing and dispersing the components, coarse particles are preferably removed using a centrifugal separator or a filter.

To make the number average particle size (particle size distribution) of the pigment fall within a desired range, a method such as, for example, making the size of pulverization media to be used smaller; making the filling ratio of pulverization media larger; making the treatment time longer; making the discharging rate slower; or classifying the particles with a filter, a centrifugal separator, or the like after pulverization is adopted. In addition, it is also preferable to use a pigment micronized in advance by a conventionally known method, such as a salt milling method.

<Aqueous Inkjet Ink>

An aqueous inkjet ink of the present invention is an ink that contains the above-described aqueous pigment dispersion and is for plastic media printing and for textile printing. The ink of the present invention can be prepared according to a conventionally known method except that the above-described aqueous pigment dispersion is used. Note that the content of the pigment in the ink is preferably 4 to 20% by mass.

The ink can contain various additives which are used for ordinary aqueous inkjet inks. Examples of the additives include a surfactant, an organic solvent, a humectant, a pigment derivative, a dye, a leveling agent, a defoamer, an ultraviolet absorber, a binder component such as an emulsion, an antiseptic, and an antibacterial agent.

The physical properties of the ink are appropriately set according to the performance of the inkjet printer, and the like. For example, the surface tension of the ink at 25° C. is preferably 20 to 40 mN/m.

The ink of the present invention can be applied to inkjet printers for plastic media printing and inkjet printers for textile printing. Examples of media (recording media) to be objects of printing include plastic films, such as an olefin film, a vinyl chloride film, a polyester film, a polyamide film; and textiles, such as cotton and a chemical fiber. Not to mention that printing on media such as paper and metals which are applied for general inkjet printing can also be performed with the ink of the present invention.

Using the ink of the present invention makes it possible to perform high-speed recording of an image having not only excellent adhesiveness, water fastness, durability, and the like but also high color developability on media such as plastic media and textiles. Further, the ink of the present invention is suited to high-speed printing and therefore suitable for inkjet printers for high-volume printing to be used for printing on food packages, packaging materials, and the like.

EXAMPLES

Hereinafter, the present invention will be described in more detail giving Examples and Comparative Examples, but the present invention is not limited by the following Examples within a range not exceeding the gist of the present invention. With regard to the amounts of components, "parts" and "%" are on a mass basis unless otherwise noted.

<Production of Polymeric Dispersant>

Synthesis Example 1

In a reaction container equipped with a stirrer, a backflow condenser, a thermometer, a nitrogen-introducing pipe, and a dropping apparatus, 100 parts of diethylene glycol monobutyl ether (BDG) was placed and heated to 70° C. in a nitrogen atmosphere. In another container, 20 parts of styrene (St), 15 parts of methyl methacrylate (MMA), 15 parts of ethyl methacrylate (EMA), 20 parts of dodecyl methacrylate (LMA), 20 parts of 2-hydroxypropyl methacrylate (HPMA), 10 parts of methacrylic acid (MAA), and 1.5 parts of azobisisobutyronitrile (AIBN) were mixed and homogenized to obtain a mixed solution of monomers. The resultant mixed solution of monomers was put into the dropping apparatus. A third of the mixed solution of monomers was added in the reaction container while the internal temperature was kept at 70° C. The rest of the mixed solution of monomers was dropped over 2 hours, and then polymerization was performed at 70° C. for 8 hours to synthesize a polymer, and thus a liquid containing the polymer was obtained. Part of the liquid was sampled to measure the molecular weight of the polymer by gel permeation chromatography (GPC) using tetrahydrofuran as a developing solvent. The results were as follows: the number average molecular weight (Mn), the polydispersity index (PDI=weight average molecular weight (Mw)/number aver-

14 neutralize the solution, and thus an aqueous solution (pale yellow, transparent liquid) of polymeric dispersant-1 was obtained. The solid content of the obtained liquid was 33.1%.

Synthesis Examples 3 to 6 and Reference Synthesis Examples 2 and 7 to 9

Aqueous solutions of polymeric dispersants-2 to 9 were obtained in the same manner as in Synthesis Example 1, described above, except that monomers, water-soluble organic solvents, and alkalis of the types and amounts (unit:part) as shown in Table 1 were used. Physical properties and the like of resultant polymeric dispersants are shown in Table 1. The meanings of abbreviations in Table 1 are as follows.
    EHMA: 2-ethylhexyl methacrylate
    HEMA: 2-hydroxyethyl methacrylate
    MPG: propylene glycol monomethyl ether
    NaOH: sodium hydroxide
    DMAE: dimethylaminoethanol

TABLE 1

| | | | Synthesis Example | | | | | Reference Synthesis Example | | | |
| | | | 1 | 3 | 4 | 5 | 6 | 2 | 7 | 8 | 9 |
| | | | | | | Polymeric dispersant | | | | | |
| | | | −1 | −2 | −3 | −4 | −5 | −6 | −7 | −8 | −9 |
|---|---|---|---|---|---|---|---|---|---|---|---|---|
| Monomer | (i) | St | 20 | 20 | 20 | 20 | 20 | 20 | 20 | 30 | 10 |
| | (ii) | MMA | 15 | 15 | 15 | 15 | 15 | 15 | 12.5 | 12.5 | 12.5 |
| | | EMA | 15 | 15 | 15 | 15 | 15 | 15 | 12.5 | 12.5 | 12.5 |
| | (iii) | EHMA | | | | 15 | 20 | 20 | 20 | | 10 |
| | | LMA | 20 | 20 | 20 | 15 | | | | 20 | 10 |
| | (iv) | HEMA | | | | 20 | 20 | 15 | 15 | 15 | 20 |
| | | HPMA | 20 | 20 | 20 | | | | | | |
| | (v) | MAA | 10 | 10 | 10 | 10 | 10 | 15 | 20 | 15 | 25 |
| Water-soluble organic solvent | BDG | | 100 | 50 | 50 | 100 | 100 | 100 | 70 | 50 | 30 |
| | MPG | | | 50 | | | | | | | |
| | Ethanol | | | | 50 | | | | 30 | 50 | 70 |
| Alkali | 28% Ammonia water | | 7.1 | | | 7.1 | 7.1 | 10.7 | | | |
| | NaOH | | | 4.6 | | | | | 9.3 | 7 | 11.6 |
| | DMAE | | | | 10.3 | | | | | | |
| Mn | | | 15,800 | 17,500 | 19,700 | 20,700 | 15,000 | 19,700 | 23,300 | 22,000 | 22,500 |
| PDI | | | 2.35 | 1.89 | 1.80 | 1.95 | 2.33 | 1.80 | 2.34 | 1.90 | 1.92 |
| PT | | | 35,900 | 30,200 | 34,800 | 39,000 | 35,000 | 34,800 | 38,000 | 37,100 | 42,000 |
| H/T (%) | | | 21.0 | 15.6 | 21.1 | 23.1 | 20.0 | 21.0 | 27.5 | 24.1 | 26.4 |
| During polymerization or appearance of solution | | | Transparent | Transparent | Transparent | Transparent | Transparent | Transparent | Transparent | Transparent | Transparent | age molecular weight (Mn)), and the peak top molecular weight (PT) of the polymer were 15,800, 2.35, and 35,900, respectively. In addition, the proportion of an area (H) of a molecular weight peak in a range of a molecular weight of 50,000 or higher in the total area (T) of the molecular weight peak in a gel permeation chromatograph (GPC chart), (H/T), was 21.0%. The solid content of the resultant liquid was 50.1%, and the polymerization rate was about 100%. The solid content was calculated from a residue obtained in such a way that part of the resultant liquid was weighed on an aluminum pan and dried with a fan dryer set at 150° C. for 3 hours.

The solution containing the polymer was cooled to 50° C., and then an aqueous alkali solution containing 7.1 parts of a 28% ammonia water and 92.9 parts of water was added to Comparative Synthesis Examples 1 to 3

Attempts were made to produce a polymeric dispersant in the same manner as in Synthesis Example 1, described above, except that MPG (Comparative Synthesis Example 1), propylene glycol monopropyl ether (PPG, Comparative Synthesis Example 2), and ethanol (Comparative Synthesis Example 3) were used respectively as the water-soluble organic solvent in place of BDG. In both cases where MPG and PPG were used respectively (Comparative Synthesis Examples 1 and 2), a liquid obtained by polymerization was transparent. The Mn, PDI, and H/T of the polymer in the liquid obtained in Comparative Synthesis Example 1 were 14,900, 1.96, and 16.6%, respectively. The Mn, PDI, and H/T of the polymer in the liquid obtained in Comparative Synthesis Example 2 were 15,100, 2.13, and 1.89%, respectively. However, when an aqueous ammonia solution was added, clouding occurred and a solid was precipitated in any of the liquids, and therefore a transparent solution of a polymeric dispersant was not able to be obtained. In the case where ethanol was used (Comparative Synthesis Example 3), turbidness occurred during polymerization and a solid was precipitated.

Comparative Synthesis Examples 4 to 6

Solutions of comparative polymeric dispersants-1 to 3 were obtained in the same manner as in Synthesis Example 1, described above, except that the amount of AIBN was changed. In Comparative Synthesis Example 4, the amount of AIBN was changed to 3 parts, and in Comparative Synthesis Example 5, the amount of AIBN was changed to 0.8 parts. In Comparative Synthesis Example 6, the water-soluble organic solvent which was the same one as used in Synthesis Example 1 was used, the whole amounts of the monomers which were of the same types and amounts as used in Synthesis Example 1 were charged, 0.1 parts of AIBN and 1.5 parts of dodecyl mercaptan as a chain transfer agent were added to perform polymerization for 4 hours, and then 0.1 parts of AIBN was further added to perform polymerization. Physical properties and the like of the resultant comparative polymeric dispersants are shown in Table 2.

| | Comparative synthesis example | | |
| --- | --- | --- | --- |
| | 4 | 5 | 6 |
| | Comparative polymeric dispersant | | |
| | -1 | -2 | -3 |
| Mn | 11,400 | 28,000 | 15,200 |
| PDI | 1.73 | 1.85 | 1.37 |
| PT | 18,200 | 47,000 | 22,500 |
| H/T (%) | 2.8 | 37.0 | 0.5 |
| During polymerization or appearance of solution | Transparent | Transparent | Transparent |

Comparative Synthesis Examples 7 to 9

Aqueous solutions of comparative polymeric dispersants-4 to 6 were obtained in the same manner as in Synthesis Example 1, described above, except that monomers of the types and amounts (unit:part) as shown in Table 3 were used. Physical properties and the like of the resultant polymeric dispersants are shown in Table 3.

TABLE 3

| | | | Comparative Synthesis Example | | |
| --- | --- | --- | --- | --- | --- |
| | | | 7 | 8 | 9 |
| | | | Comparative polymeric dispersant | | |
| | | | -4 | -5 | -6 |
| Monomer | (i) | St | 30 | 10 | 20 |
| | (ii) | MMA | 20 | | 15 |
| | | EMA | 10 | | 15 |
| | (iii) | EHMA | | 10 | 15 |
| | | LMA | | 20 | 15 |
| | (iv) | HEMA | 20 | 20 | |
| | | HPMA | | | |

TABLE 3-continued

| | | Comparative Synthesis Example | | |
| --- | --- | --- | --- | --- |
| | | 7 | 8 | 9 |
| | | Comparative polymeric dispersant | | |
| | | -4 | -5 | -6 |
| (v) | MAA | 20 | 20 | 20 |
| Mn | | 18,600 | 20,900 | 17,400 |
| PDI | | 1.79 | 1.80 | 1.80 |
| PT | | 30,200 | 35,800 | 29,500 |
| H/T (%) | | 19.6 | 22.2 | 21.1 |
| During polymerization or appearance of solution | | Transparent | Transparent | Transparent |

<Preparation (1) of Pigment Dispersion and Ink>

Example 1

A transparent solution was obtained by mixing 261.7 parts of the solution of polymeric dispersant-1, 70 parts of propylene glycol, and 106.4 parts of water. To the obtained solution, 350 parts of C.I. Pigment Blue 15:3 (trade name "A-220JC," manufactured by Dainichiseika Color & Chemicals Mfg. Co., Ltd.) was added, and the resultant mixture was stirred using a disper for 30 minutes to prepare a mill base. The pigment was sufficiently dispersed in the mill base by a dispersion treatment using a horizontal media disperser (trade name "DYNO-MILL 0.6 Liter ECM TYPE," manufactured by SHINMARU ENTERPRISES CORPORATION, diameter of zirconia beads: 0.5 mm) at a peripheral speed of 10 m/s. The pigment concentration was adjusted to 18% by adding 316 parts of water. The mill base was subjected to a centrifugal separation treatment (7,500 rpm for 20 minutes) and then filtered with a membrane filter having a pore size of 10 μm. The filtrate was diluted with water to obtain pigment dispersion-1 (IJD-1) for an inkjet ink, in which the concentration of the pigment was 14%.

The number average particle size of the pigment in IJD-1, as measured using a particle size analyzer (product name, "NICOMP 380ZLS-S," manufactured by Particle Sizing Systems, Inc.) was 116 nm, which confirmed that the pigment was finely dispersed. In addition, the viscosity and pH of IJD-1 were 2.9 mPa·s and 9.5, respectively. The number average particle size of the pigment in IJD-1 after being stored at 70° C. for 1 week was 116 nm, and the viscosity of IJD-1 after being stored at 70° C. for 1 week was 2.9 mPa·s. This confirmed that the storage stability of IJD-1 is very good.

An inkjet ink (IJI-1) was obtained by mixing 40 parts of IJD-1, 42.2 parts of water, 5 parts of 1,2-hexanediol, 10 parts of glycerin, and 1 part of a surfactant (trade name "Surfynol 465," manufactured by Air Products and Chemicals, Inc.) and sufficiently stirring a resultant mixture, and then filtering the mixture with a membrane filter having a pore size of 10 μm.

Examples 3 to 6, Reference Examples 2 and 7 to 9, and Comparative Examples 4 to 9

Pigment dispersions-2 to 9 (IJD-2 to 9) for an inkjet ink and comparative pigment dispersions-1 to 6 (CIJD-1 to 6) for an inkjet ink were prepared in the same manner as in Example 1, described above, except that polymeric dispersants and comparative polymeric dispersants of the types as shown in Tables 4 and 5 were used respectively. Properties (the number average particle size of the pigment and the viscosity immediately after dispersion and after storage at 70° C. for 1 week) of each pigment dispersion are shown in Tables 4 and 5.

Further, aqueous inkjet pigment inks (IJI-2 to 9) and comparative aqueous inkjet pigment inks (CIJI-1 to 6) were obtained in the same manner as in Example 1, described above, except that prepared IJD-2 to 9 and CIJD-1 to 6 were used respectively.

<Evaluation (1)>

The prepared aqueous pigment inks were filled in cartridges respectively, and the cartridges were installed in an inkjet printer with a plate heater (trade name "MMP825H," manufactured by Mastermind Co., Ltd.) respectively. Then, a solid image was printed on a PET film (trade name "FE22001 #50," manufactured by Futamura Chemical Co., Ltd.) heated with the plate heater in such a way that the surface temperature reached 50° C., and thus printed materials were obtained.

(Dispersibility)

The dispersibility was evaluated for the prepared pigment dispersions according to the following evaluation criteria. Results are shown in Tables 4 and 5.

Good: the pigment can be finely dispersed, and the storage stability is good.

Fair: the pigment can be finely dispersed, but the storage stability is poor.

Poor: the pigment cannot be finely dispersed, and the storage stability is poor.

(Ejection Properties)

The ejection state of each ink during printing was visually observed to evaluate the ejection properties of the ink according to the following evaluation criteria. Results are shown in Tables 4 and 5.

Good: the ink can be ejected without a problem.

Fair: splattering of fine droplets is recognized.

Poor: droplets splash and splatter during ejection, which disrupts the image.

(Image Quality)

Each printed image was visually observed to evaluate the image quality according to the following evaluation criteria. Results are shown in Tables 4 and 5.

Good: a good image can be recorded.

Poor: the image was disrupted by a streak or the like.

(Adhesiveness)

After each printed material was dried at 100° C. for 10 minutes, a cellophane tape was sufficiently pressed onto the image and then peeled. The extent of peeling of the image from the PET film was visually observed to evaluate the adhesiveness of the image to the PET film according to the following evaluation criteria. Results are shown in Tables 4 and 5.

Excellent: the image is not peeled at all.

Good: the image is slightly peeled.

Fair: the area where the image is peeled is smaller than the area where the image is not peeled.

Poor: the area where the image is peeled is larger than the area where the image is not peeled.

(Rub Resistance (Dry Rub Resistance and Wet Rub Resistance))

After each printed material was dried at 100° C. for 10 minutes, a rubbing test of rubbing the image back and forth times with dried white cloth or wet white cloth with a load of 100 g using a Gakushin-Type rubbing tester (trade name "RT-300," manufactured by DAIEI KAGAKU SEIKI CO., LTD.) was performed.

The extent of peeling of the image after the rubbing test was visually observed to evaluate the rub resistance (wet rub resistance and wet rub resistance) of the image according to the following evaluation criteria. Results are shown in Tables 4 and 5.

Excellent: the image is not peeled at all.

Good: the image is slightly peeled.

Fair: the area where the image is peeled is smaller than the area where the image is not peeled.

Poor: the area where the image is peeled is larger than the area where the image is not peeled.

TABLE 4

| | | Example | | | | | | | | |
| | | 1 | 3 | 4 | 5 | 6 | | | | |
| | | | | Reference example | | | | | | |
| | | | 2 | | | | | 7 | 8 | 9 |
| | | | | | IJD- | | | | | |
| | | 1 | 2 | 3 | 4 | 5 | 6 | 7 | 8 | 9 |
| | | | | | Polymeric dispersant | | | | | |
| | | −1 | −2 | −3 | −4 | −5 | −6 | −7 | −8 | −9 |
| Immediately after dispersion | Number average particle size (nm) | 116 | 109 | 108 | 109 | 102 | 105 | 109 | 111 | 115 |
| | Viscosity (mPa · s) | 2.9 | 2.8 | 2.7 | 2.8 | 2.7 | 2.8 | 2.9 | 2.8 | 2.8 |
| After storage at 70° C. | Number average particle size (nm) | 116 | 109 | 107 | 109 | 104 | 105 | 108 | 110 | 116 |
| | Viscosity (mPa · s) | 2.9 | 2.8 | 2.7 | 2.8 | 2.7 | 2.7 | 2.8 | 2.8 | 2.8 |
| Dispersibility | | Good | Good | Good | Good | Good | Good | Good | Good | Good |
| Ejection properties | | Good | Good | Good | Good | Good | Good | Good | Good | Good |
| Print quality | | Good | Good | Good | Good | Good | Good | Good | Good | Good |
| Adhesiveness | | Excellent | Excellent | Excellent | Excellent | Excellent | Excellent | Excellent | Excellent | Excellent |
| Dry rub resistance | | Good | Good | Good | Excellent | Excellent | Excellent | Excellent | Excellent | Excellent |
| Wet rub resistance | | Good | Good | Good | Good | Good | Good | Good | Good | Good |

TABLE 5

| | | Comparative Example | | | | | |
|---|---|---|---|---|---|---|---|
| | | 4 | 5 | 6 | 7 | 8 | 9 |
| | | CIJD- | | | | | |
| | | 1 | 2 | 3 | 4 | 5 | 6 |
| | | Comparative polymeric dispersant | | | | | |
| | | −1 | −2 | −3 | −4 | −5 | −6 |
| Immediately after dispersion | Average particle size (nm) | 120 | 186 | 112 | 108 | 112 | 108 |
| | Viscosity (mPa · s) | 2.9 | 3.5 | 2.9 | 2.7 | 2.9 | 2.8 |
| After storage at 70° C. | Average particle size (nm) | 143 | 174 | 114 | 108 | 114 | 108 |
| | Viscosity (mPa · s) | 3.6 | 2.9 | 2.8 | 2.7 | 2.8 | 2.8 |
| Dispersibility | | Poor | Poor | Good | Good | Good | Good |
| Ejection properties | | Good | Poor | Good | Good | Good | Good |
| Print quality | | Good | Poor | Good | Good | Good | Good |
| Adhesiveness | | Poor | Good | Poor | Good | Fair | Fair |
| Dry rub resistance | | Poor | Good | Poor | Fair | Poor | Fair |
| Wet rub resistance | | Poor | Good | Poor | Fair | Poor | Fair |

<Preparation (1) of Pigment Dispersion and Ink>

Examples 10 to 12

Pigment dispersions-10 to 12 (IJD-10 to 12) and inks (IJI-10 to 12) were obtained in the same manner as in Example 5, described above, except that C.I. Pigment Red 122 (manufactured by Dainichiseika Color & Chemicals Mfg. Co., Ltd.), C.I. Pigment Yellow 155 (manufactured by Clariant (Japan) K.K.), and C.I. Pigment Black 7 (manufactured by Degussa AG) were used respectively in place of C.I. Pigment Blue 15:3.

<Evaluations (2)>

Evaluations which were the same as those in Evaluation (1), described above, were performed for the obtained pigment dispersions and inks. Results are shown in Table 6 together with the results of Example 5.

TABLE 6

| | | Example | | | |
|---|---|---|---|---|---|
| | | 5 | 10 | 11 | 12 |
| | | IJD- | | | |
| | | 5 | 10 | 11 | 12 |
| Pigment | | PB-15:3 | PR-122 | PY-155 | PB-7 |
| Polymeric dispersant | | −5 | −5 | −5 | −5 |
| Immediately after dispersion | Average particle size (nm) | 102 | 129 | 172 | 98 |
| | Viscosity (mPa · s) | 2.7 | 3.3 | 2.8 | 2.7 |
| After storage at 70° C. | Average particle size (nm) | 104 | 129 | 172 | 97 |
| | Viscosity (mPa · s) | 2.7 | 3.3 | 2.8 | 2.7 |
| Dispersibility | | Good | Good | Good | Good |
| Ejection properties | | Good | Good | Good | Good |
| Print quality | | Good | Good | Good | Good |
| Adhesiveness | | Excellent | Excellent | Excellent | Excellent |
| Dry rub resistance | | Excellent | Excellent | Excellent | Excellent |
| Wet rub resistance | | Good | Good | Good | Good |

<Production and Evaluation of Printed Textile>

Application Examples 1 to 4 and Comparative Application Example 1

Inks were prepared using IJD-5, 10, 11 and 12, and CIJD-4 respectively. Specifically, each inkjet ink was prepared by sufficiently stirring a mixture of 20 parts of the pigment dispersion, 20 parts of an water dispersion of a urethane resin (average particle size measured by light scattering method: 42.2 nm and solid content: 25.0%), 33 parts of water, 26 parts of propylene glycol, and 1 part of a surfactant (trade name "Surfynol 465," manufactured by Air Products and Chemicals, Inc.), and then filtering the mixture with a membrane filter having a pore size of 10 μm. As the urethane resin, a resin (acid value: 34.2 mgKOH/g) formed of isophorone diisocyanate/polyhexamethylene carbonate diol/dimethylol butanoic acid/hydrazine and neutralized with triethylamine was used.

The prepared inks were filled in cartridges respectively, and the cartridges were installed in an inkjet printer (trade name "HEATJET MMP813H," manufactured by Mastermind Co., Ltd.) respectively.

A solid image was printed using this printer on a cotton fabric (ring-spun cotton 100%) colored with a black dye, and thus printed materials were obtained. The resultant printed materials were pressurized for 60 seconds to fix the inks on the fabrics using an automatic ironing press machine (trade name "SATANAS PS-4634," manufactured by EUROPORT Co., Ltd.), and thus printed textiles were obtained.

The resultant printed textiles were washed 3 times for 15 minutes with hot water of 40° C. containing a detergent in an amount of 2 g/L using a small-sized automatic washing machine (trade name "晴 晴 Mini AKS-2.5GL," manufactured by ALUMIS CO., LTD.). Note that the washing was performed under a condition of water:fabric=30:1 (mass ratio). As the detergent, "Attack," product name (manufactured by Kao Corporation), was used. After dewatering, rinsing was performed for 2 minutes, and dewatering and drying were further performed. The degree of change in standard scale color was compared with the grey scale for assessing change in color and the blue scale for assessing change in color based on JIS L0805 to evaluate the color fastness to washing according to the following evaluation criteria. Results are shown in Table 7.

A: Grade 4 to 5 to Grade 5
B: Grade 3 to 4 to Grade 4
C: Grade 2 to 3 to Grade 3
D: Grade 2 or lower

TABLE 7

| | Application Example 1 | Application Example 2 | Application Example 3 | Application Example 4 | Comparative Application Example 1 |
|---|---|---|---|---|---|
| Pigment dispersion | IJD-5 | IJD-10 | IJD-11 | IJD-12 | CIJD-4 |
| Color fastness to washing | A | A | A | A | C |

INDUSTRIAL APPLICABILITY

Use of the polymeric dispersant of the present invention makes it possible to provide an aqueous inkjet ink suitable for recording on plastic media and printing on textiles (fabrics). Then, use of this inkjet ink makes it possible to print a high-quality image on, for example, various containers, packaging materials, labels, signs and displays, banners, and cloths on-demand at a high speed.

The invention claimed is:

1. A polymeric dispersant for dispersing a pigment and is configured to be blended in an aqueous pigment dispersion for an aqueous inkjet ink and to be printed on a plastic media or a textile, the polymeric dispersant comprising a polymer, wherein (1) the polymer comprises:
   (i) a styrene-based constituent unit formed from a styrene monomer in an amount from 10 to 30% by mass,
   (ii) a first methacrylate-based constituent unit in an amount from 10 to 30% by mass, wherein a first methacrylate monomer forming the first methacrylate-based constituent unit is at least one material selected from the group consisting of methyl methacrylate and ethyl methacrylate,
   (iii) a second methacrylate-based constituent unit in an amount from 10 to 30% by mass, wherein a second methacrylate monomer forming the second methacrylate-based constituent unit is at least one material selected from the group consisting of 2-ethylhexyl methacrylate and dodecyl methacrylate,
   (iv) a third methacrylate-based constituent unit in an amount from 10 to 20% by mass, wherein a third methacrylate monomer forming the third methacrylate-based constituent unit is at least one material selected from the group consisting of 2-hydroxyethyl methacrylate and 2-hydroxypropyl methacrylate, and
   (v) a methacrylic acid-based constituent unit formed from a methacrylic acid monomer in an amount of 10 to 20% by mass, wherein the methacrylic acid-based constituent unit has a carboxylic acid group of the methacrylic acid monomer therein, and at least part of the carboxylic acid group is neutralized with at least one alkali selected from the group consisting of ammonia and dimethylaminoethanol,
a total content of the constituent units (i) to (v) is 90% by mass or more, and
the polymer comprises the constituent units (i) to (v) formed from 6 or more different monomers, and (2) the polymer has:
   a number average molecular weight in a range from 15,000 to 25,000,
   a peak top molecular weight in a range from 25,000 to 50,000,
   a polydispersity index, which is a ratio of weight average molecular weight/number average molecular weight, being in a range from 1.7 to 2.4, and
   an area ratio (H/T) is in a range from 15 to 30%, where an area H is a peak of a molecular weight of 50,000 or higher, and an area T is a total area of a molecular weight peak, in a gel permeation chromatograph.

2. The polymeric dispersant according to claim 1, wherein the second methacrylate-based constituent unit (iii) is a constituent unit formed from dodecyl methacrylate as a monomer, or a constituent unit formed from 2-ethylhexyl methacrylate and dodecyl methacrylate as monomers.

3. A method for producing a polymeric dispersant according to claim 1, the method comprising:
   subjecting monomers to solution polymerization in a polymerization solvent comprising diethylene glycol monobutyl ether, and then
   adding an alkali to make a polymerization solution into an aqueous solution.

4. The method for producing a polymeric dispersant according to claim 3, wherein the solution polymerization is performed in the polymerization solvent comprising 70% by mass or more of diethylene glycol monobutyl ether based on an amount of the polymeric dispersant that is the polymer to be produced.

5. An aqueous pigment dispersion for an aqueous inkjet ink configured to be printed on plastic media or textile, comprising:
   a pigment; water; a water-soluble organic solvent; and a polymeric dispersant according to claim 1 that disperses the pigment.

6. The aqueous pigment dispersion according to claim 5, wherein the water-soluble organic solvent is diethylene glycol monobutyl ether.

7. The aqueous pigment dispersion according to claim 5, wherein in the dispersion, a content of the pigment is in a range from 5 to 60% by mass,
   a content of the water is in a range from 20 to 80% by mass,
   a content of the water-soluble organic solvent is 30% by mass or less, and
   a content of the polymeric dispersant is in a range from 0.5 to 20% by mass.

8. An aqueous inkjet ink for plastic media printing and textile printing, comprising the aqueous pigment dispersion according to claim 5.

* * * * *